UNITED STATES PATENT OFFICE.

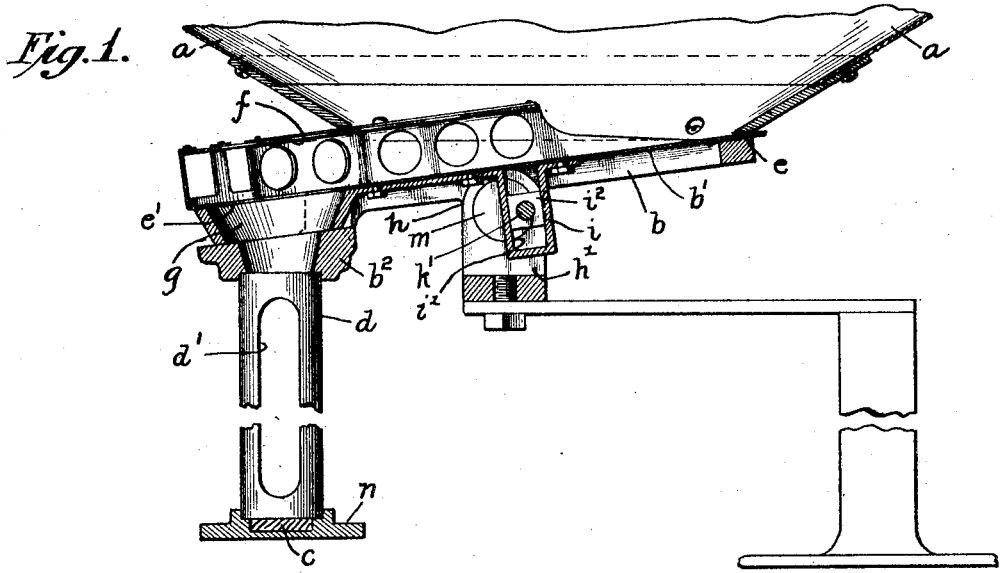
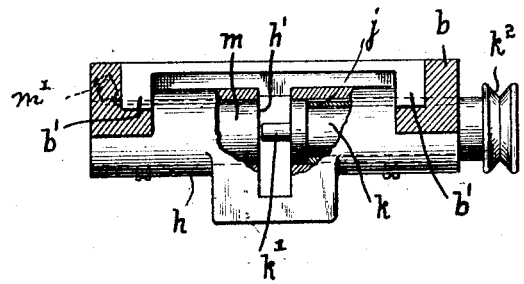
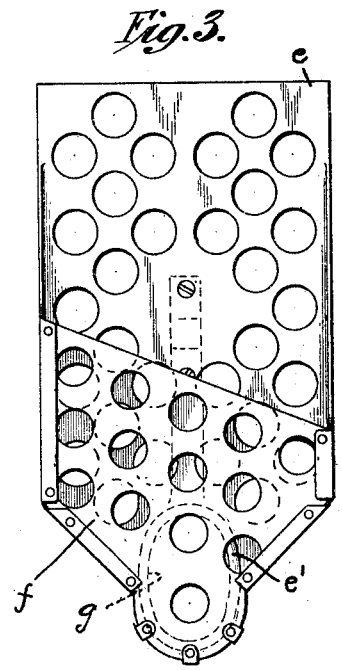

BERTHOLD NAGY, OF BROOKLYN, NEW YORK.

FEEDING ATTACHMENT FOR CROWN-CORK-MAKING MACHINES.

1,419,583.  Specification of Letters Patent.  Patented June 13, 1922.

Application filed December 18, 1917. Serial No. 207,766.

*To all whom it may concern:*

Be it known that I, BERTHOLD NAGY, a subject of the King of Hungary, residing at the borough of Brooklyn, city of New York, county of Kings, and State of New York, have invented certain new and useful Improvements in Feeding Attachments for Crown-Cork-Making Machines, of which the following is a specification, reference being had therein to the accompanying drawings, which form a part thereof.

My invention relates to feeding attachments for crown cork making machines, and more particularly to a mechanism by which the cork discs are fed from a hopper into a relation whereby they may be delivered to the assembling mechanisms of the machine.

The assembling mechanisms of a machine for making crown cork bottle caps operate at high speed, and it is essential that the cork discs be fed in relation to these mechanisms uniformly and with substantial continuity in order to synchronize the feeding mechanism with such other mechanisms. It is also desirable to so construct the cork disc feeding mechanism that dust and small fragments from the discs will be separated from the discs before they are delivered to the other mechanisms of the machine.

In carrying out my invention, I have provided a mechanism in which the discs may freely flow from the hopper into a mechanism which will convey them rapidly to a collecting and feeding tube from which they are delivered to the mechanism applying them to the metal portions of the cap, said conveying mechanism being constantly vibrated in a manner to ensure not only the delivery of the discs to said tube but the separation of the discs from each other in a manner to cause them to advance in bulk toward said tube yet be fed one at a time thereinto. This conveying mechanism is so constructed as to retard the escape of the discs from the hopper and thus proportion the number of discs delivered from the hopper to the capacity of the conveying mechanism and the mechanism for delivering the discs from the feeding attachment to other mechanisms of the machine. The conveying mechanism is so constructed that the operator of the machine may have ready access to this mechanism in the event that the discs therein become jammed in a manner to interrupt the proper feeding of the discs. A further object of the invention is to provide such a mechanism wherein the desired vibratory movement of the conveyer may be imparted thereto, by a structure which will permit the quick and convenient removal of the conveyer to facilitate its renewal in the event of wear thereon.

The invention consists primarily in a feeding attachment for crown cork making machines embodying therein an open bottom hopper, a movable plate mounted below and spaced away from the discharge of said hopper and having an outlet opening therethrough, a chute, one open end of which terminates adjacent the outlet opening in said plate, and the other open end of which terminates adjacent the cork disc feeding mechanism of an assembling machine, means adjacent said outlet opening confining the discs upon said plate, and means imparting continuous vibratory movement to said plate, whereby the discs discharged from the hopper upon said plate, will be constantly agitated and advanced upon said plate until discharged through the outlet opening thereof into said chute; and in such other novel features of construction and combination of parts as are hereinafter set forth and described and more particularly pointed out in the claims hereto appended.

Referring to the drawings:

Fig. 1 is a view partly in side elevation and partly in section, of a feeding attachment made in accordance with my invention;

Fig. 2 is a detail view of the mechanism imparting vibratory movement to the conveyer plate; and Fig. 3 is a plan view of the conveyer plate and the confining walls adjacent one end thereof.

Like letters refer to like parts throughout the several views.

A feeding attachment made in accordance with my invention is designed solely for the purpose of receiving and storing a large number of cork discs and feeding these discs gradually and continuously in relation to the assembling mechanisms of a crown cork making machine with sufficient rapidity to ensure continuity in the operation of this machine. It may be used with a large number of different types of assembling machines.

An attachment made in accordance with the embodiment of my invention shown in the drawings comprises a hopper *a* having a normally open bottom, mounted upon a suitable supporting frame $b$. Extending from the frame $b$ to a point adjacent the feed plunger $c$ of the assembling machine is a circular chute $d$ having in one side thereof a slot $d'$ of sufficient length and width to enable the operator of the machine to adjust the cork discs contained in this chute in the event any of the discs are slightly skewed.

Movably mounted upon the frame $b$ is a conveyer plate $e$ which projects across the open bottom of the hopper $a$ and is spaced away therefrom a progressively increasing distance toward the end thereof nearest the feed plunger $c$ sufficiently to provide sufficient clearance for the discs to fall from the hopper upon said plate. This plate $e$ adjacent the open mouth of the tubular hopper has a discharge opening $e'$ therethrough, through which the disc may fall from said plate to within said chute.

In order to impart a normal tendency of the discs to move upon said plate from adjacent the discharge of the hopper to the discharge opening through said plate, said plate is inclined from the discharge opening therein toward the point of delivery of the discs thereto from the hopper, this condition in the form of the invention shown being secured by mounting the plate $e$ upon oppositely disposed inclined ways $b'$ formed in the sides of the frame $b$.

To prevent the escape of discs from the plate $e$, I form a barrier completely surrounding this plate, this barrier in the form of the invention shown being formed in parts by the walls of the frame $b$ and in part by an inclosing casing $f$ carried by and movable with said frame, the top of said casing being of a length not to interfere with the discharge of discs from the hopper upon said plate while the attachment is in operation.

The plate $e$ has a plurality of openings therethrough in addition to the discharge opening $e'$, these other openings being, however, smaller than the dimensions of the discs, said openings permitting the escape of dust and small particles of cork, or imperfectly formed discs from the said plate. The space within the frame $b$ below the ways $b'$, is open, so as to permit the matter passing through the opening in said plate to escape from the plate and thus prevent their clogging the feeding mechanism of the assembling machine. The casing $f$ has a number of openings therethrough similar to the opening in the plate $e$, through which the operator may insert his, or her, finger and agitate the discs contained within said casing, upon the plate $e$, in the event that these discs become so jammed as to prevent the proper feeding of the discs through the outlet opening $e'$.

The casing $f$ has a side wall projecting at substantially right angles from the plate $e$ and a top wall substantially parallel with the plate $e$, the rear edge of said top wall extending obliquely to the line of movement of said plate.

The plate $e$ receives constant, rapid vibratory movement in order to ensure the proper advance of the discs from adjacent the hopper to the point of discharge into the chute $d$, this vibratory movement, in the form of the invention shown, consisting of the rapid reciprocation of the plate $e$ upon the ways $b'$.

To impart this recriprocatory movement, I provide a tubular bearing $h$ extending transversely of the frame $b$, said bearing having centrally thereof a slot $h'$ adapted to receive a lug $i$ secured to the bottom of the plate $e$. Said lug $i$ has an elongated slideway $i'$ therein in which a reciprocatory bearing member $i^2$ is slidably mounted. The bearing $h$ at one side of the slot $h'$ has a bushing $j$ removably mounted therein, in which bushing a shaft $k$ having a crank pin $k'$ cooperating with the slide bearing $i^2$ is rotatably mounted. The shaft $k$ carries a pulley $k'$ by means of which the shaft $k$ may be driven by means of a belt, not shown, from a suitable co-operating pulley, driven from the actuating means for the assembling machine.

The portion of the bearing $h$ upon the other side of the slot $h'$, has mounted therein a plug $m$ having an oil groove communicating with the bearing cap $m'$, thus affording ample lubrication for the slide $i^2$ as well as for the lug $i$.

By the construction shown, the shaft $k$ and its bushing $j$ may be inserted from the outer open end of the bearing $h$, and held in position by means of the bushing $j$, the end of said shaft being provided with a plate overlapping the inner end of the bushing. Furthermore, the bushing $j$ and its shaft, and the plug $m$ are interchangeable so that power may be derived from either side of the machine.

The various openings in the plate $e$ and the casing $f$, in addition to having the functions above referred to, serve to lighten said plate and its casing so as to minimize both the wear on these parts, and the power required for actuating said plate.

The upper end of the tubular chute $d$ fits into a socket upon a cross member $b^2$ carried by the frame $b$, and the lower end thereof fits into a socket in the fitting $n$ in which the slide or feed plunger $c$ of the assembling mechanism operates.

In order to ensure a substantial uniform continuous delivery of discs from the plate $e$ to the chute $d$, I make the opening $e'$ substantially elliptical, the minor axis of the ellipse of which is slightly greater than the diameter of the disc and the major axis of which extends in the direction of movement of the plate and is great enough to ensure a constant communication of the opening with the mouth of said chute. About the opening $e'$, I provide a throat $g$, the inside dimensions of which substantially coincide with those of the opening $e'$, said throat having converging walls ensuring the dropping of the discs successively through said opening, and their delivery to the chute $d$ through a tapering opening in the plate supporting the top of said chute.

The operation of the herein described device is substantially as follows:—

The hopper $a$ is filled with a large number of cork discs in bulk, the covering walls of this hopper causing the entire volume of this bulk to be ultimately brought to the open bottom of the hopper from which they fall promiscuously and fairly rapidly upon the plate $e$. Said plate always projects across the bottom of the hopper, and is spaced away therefrom sufficiently to prevent the clogging of the outlet of the hopper by the jamming of discs between the plate $e$ and the edge of the bottom of the hopper toward the chute $d$. The inclination of the plate $e$ causes gravity to impart a normal tendency, in the discs to move toward said chute $d$, which tendency, however, is supplemented by the rapid vibratory movement of the plate by the crank $k'$ and its continuously rotating shaft $k$, said shaft being rotated at high speed, thus constantly agitating the discs delivered upon the plate $e$ and causing them to rapidly move more or less intermittently toward the discharge opening $e'$ of said plate. This agitation will also sift any dust, small particles of cork, or broken discs from the perfect discs, this matter dropping through the openings in the plate $e$ and between the ways $b'$.

As the shaft $k$ rotates, it will impart a reciprocatory movement to the plate $e$ through the movement of the bearing $i^2$ in the slot $i'$ of the lug $i$. By having the slot $i'$ of sufficient length, the movement of the plate $e$ may be limited to a reciprocatory movement alone, or by shortening this slot, if desired, the plate may be raised and lowered with each rotation of the shaft $k$ sufficiently to increase the agitating effect upon the disc thereupon.

As the discs approach the opening $e'$ through the plate $e$, they enter the casing $f$ which confines them in a manner to ensure all of the discs being retained about the outlet opening $e'$ until they descend through this opening into the chute $d$.

By using an elliptical throat $g$, the discharge opening $e'$ of the plate $e$ is in continuous communication with the inlet of the chute $d$ so as to permit discs to drop continuously from the plate $e$ into said chute. In actual use, the discs are guided towards the opening $e'$ by the conveying side walls of the casing $f$, and in the event of discs being delivered by the plate in excess of the capacity of the chute $d$, such discs are engaged by the forward wall of the casing $f$ and thrown backward through said opening $e'$. If two or more discs interfere with each other at the opening $e'$, the constant vibration of the plate $e$, will impart such movement to these discs as to permit other discs to pass through the opening, and separate the interfering discs so as to permit them to fall consecutively through the opening. Ordinarily, the discs will remain substantially horizontally upon the plate $e$ so as to pass through the opening $e'$, in a substantially horizontal position, or tilted slightly from the horizontal, thus accurately positioning them in the chute $d$. Sometimes, however, it happens that a disc will fall edgewise through said opening and the throat $g$, and by the accumulation of other discs thereon remain slightly askew in the chute $d$. The opening $d'$ in this chute, however, permits the operator to raise one side of the disc and permit it and other discs above it, to drop into the proper horizontal position. If left alone, however, the gradual descent of the piles of discs has a tendency to ultimately adjust the discs in the proper position in the tube. The lowermost disc in the tube is fed by the plunger $c$ in relation to the assembling mechanisms of the cork making machines.

The casing $f$ or other confining means about the outlet opening $e'$ of the plate $e$ is essential since the discs are violently agitated and have a more or less eccentric feeding movement, being frequently in pile of several discs. The oblique edge of the casing will prevent discs rolling upon their edge towards the opening $e'$, but permit them to roll transversely of the plate $e$ until the vibration of the plate delivers them flatwise within said casing.

I have found in actual practice that a feeding attachment such as is herein described, will accumulate discs in the chute $d$ in the proper position and with sufficient rapidity to ensure continuity in the delivery of these discs to other mechanisms of the assembling machine, and that there is little or no tendency of the discs to accumulate upon the plate $e$ and within the casing $f$ in sufficient numbers to jam or clog the feeding apparatus.

The width of the plate $e$ and the space between same and the hopper is considerably greater than the diameter of a cork disc, it being essential that a number of discs be advanced simultaneously in order to ensure the desired rapidity in the delivery of these discs to the chute $d$. The height of the casing $f$ is also greater than the thickness of a cork disc, in order to permit the desired freedom of movement of the discs with relation to the plate e about the discharge opening e'.

In advancing from the hopper outlet, the discs have irregular movement and occupy different positions, although, the general tendency of the discs is to lay flatwise upon the said plate.

The dimensions of the outlet of the hopper are immaterial since there is a tendency of the discs to accumulate upon the plate e below this outlet and to be advanced from this position only as a result of the vibratory movement of the plate.

It is not my intention to limit the invention to the precise details of construction shown in the accompanying drawings, it being apparent that such may be varied without departing from the spirit and scope of the invention.

Having described the invention what I claim as new and desire to have protected by Letters Patent is:—

1. A feeding attachment for crown cork assembling machines embodying therein a hopper adapted to receive cork discs in bulk and having an open bottom adapted to permit a mass of cork to simultaneously pass therethrough, a vertically extending chute, the lower end of which terminates adjacent the cork disc feeding mechanism of an assembling machine, a plate mounted below the open bottom of said hopper and having an outlet opening therethrough adapted to permit disks to pass into the open top of said chute, said plate extending on an incline from adjacent said chute to adjacent said hopper, whereby cork discs have a tendency to move along said plate by gravity from adjacent said hopper to adjacent said outlet opening, means imparting continuous vibratory movement to said plate in the direction of the feeding movement of the disks thereon from said hopper to said chute, whereby discs thereon will be kept in continuous motion and will be caused to progress flatwise thereupon, and confining means adjacent said outlet opening, whereby discs will be successively directed therethrough into said chute.

2. A feeding attachment for crown cork assembling machines embodying therein a hopper adapted to receive cork discs in bulk and having an open bottom adapted to permit a mass of cork to simultaneously pass therethrough, a vertically extending chute, the lower end of which terminates adjacent the cork disc feeding mechanism of an assembling machine, a plate mounted below the open bottom of said hopper and having an outlet opening therethrough adapted to permit disks to pass into the open top of said chute, said plate extending on an incline from adjacent said chute to adjacent said hopper, whereby cork discs have a tendency to move along said plate by gravity from adjacent said hopper to adjacent said outlet opening, means imparting continuous vibratory movement to said plate in the direction of the feeding movement of the disks thereon from said hopper to said chute, whereby discs thereon will be kept in continuous motion and will be caused to progress flatwise thereupon, confining means adjacent said outlet opening, whereby discs will be successively directed therethrough into said chute, and means arranged intermediate the point of delivery of discs upon said plate, and said discharge opening projecting toward said plate to a point which will engage the upper portion of any discs which stand edgewise upon said plate and cause them to assume a position flatwise thereof.

3. A feeding attachment for crown cork making machines embodying therein a frame, an open bottom hopper supported thereby, a cross bar having an opening therethrough, a chute, one open end of which communicates with the opening in said cross bar and the other open end of which terminates adjacent the cork disc feeding mechanism of an assembling machine, ways upon said frame inclined from adjacent said cross bar toward said hopper, a movable plate mounted upon said ways below, and spaced away from, the bottom of said hopper, and having an outlet opening therethrough adjacent the opening in said cross bar, means adjacent said opening confining the discs upon said plate, and means imparting continuous vibratory movement to said plate, whereby the discs discharged from the hopper upon said plate, will be constantly agitated and advanced upon said plate until discharged through the outlet opening thereof into said chute.

4. A feeding attachment for crown cork making machines embodying therein a frame, an open bottom hopper supported thereby, a cross bar having an opening therethrough, a chute, one open end of which communicates with the opening in said cross bar and the other open end of which terminates adjacent the cork disc feeding mechanism of an assembling machine, ways upon said frame inclined from adjacent said cross bar toward said hopper, a movable plate mounted upon said ways below, and spaced away from, the bottom of said hopper, and having an outlet opening therethrough adjacent the opening in said cross bar, a casing inclosing a portion of said plate and confining discs thereupon about said outlet opening, said casing being carried by and movable with said plate, and means imparting continuous vibratory movement to said plate, whereby the discs discharged from the hopper upon said plate, will be constantly agitated and advanced upon said plate until discharged through the outlet opening thereof into said chute.

5. A feeding attachment for crown cork making machines embodying therein a frame, an open bottom hopper supported thereby, a cross bar having an opening therethrough, a chute, one open end of which communicates with the opening in said cross bar and the other open end of which terminates adjacent the cork disc feeding mechanism of an assembling machine, ways upon said frame inclined from adjacent said cross bar toward said hopper, a movable plate mounted upon said ways below, and spaced away from, the bottom of said hopper, and having an outlet opening therethrough adjacent the opening in said cross bar, a casing inclosing a portion of said plate and confining discs thereupon about said outlet opening, said casing being carried by and movable with said plate, said casing comprising a side wall, portions of which converge toward said outlet opening and a top, the edge of which adjacent said hopper extends obliquely to the line of movement of said plate and is spaced away from said plate less than the diameter of a disc, and means imparting continuous vibratory movement to said plate, whereby the discs discharged from the hopper upon said plate, will be constantly agitated and advanced upon said plate until discharged through the outlet opening thereof into said chute.

6. A feeding attachment for crown cork making machines embodying therein an open bottom hopper, a movable plate mounted below the discharge of said hopper and having an elliptical outlet opening therethrough, a chute, one open end of which terminates adjacent the outlet opening in said plate, and the other open end of which terminates adjacent the cork disc feeding mechanism of an assembling machine, said plate being spaced away from the discharge of said hopper a progressively increasing distance toward said chute, means adjacent said outlet opening confining the discs upon said plate, and means imparting continuous vibratory movement to said plate, in the direction of the feeding movement of the discs thereon from said hopper to said chute, whereby the discs discharged from the hopper upon said plate, will be constantly agitated and advanced upon said plate until discharged through the outlet opening thereof into said chute.

7. A feeding attachment for crown cork making machines embodying therein a frame, an open bottom hopper supported thereby, a cross bar having a tapering opening therethrough, a chute, one open end of which communicates with the opening in said cross bar and the other open end of which terminates adjacent the cork disc feeding mechanism of an assembling machine, ways upon said frame inclined from adjacent said cross bar toward said hopper, a movable plate mounted upon said ways below, and spaced away from, the bottom of said hopper, and having an elliptical outlet opening therethrough adjacent the opening in said cross bar, a casing inclosing a portion of said plate and confining discs thereupon about said outlet opening, said casing being carried by and movable with said plate, an elliptical throat carried by said plate having converging sides leading from said outlet opening and constantly communicating with said opening in said cross bar, and means imparting continuous vibratory movement to said plate, whereby the discs discharged from the hopper upon said plate, will be constantly agitated and advanced upon said plate until discharged through the outlet opening thereof into said chute.

In witness whereof, I hereunto affix my signature, in the presence of two subscribing witnesses, this 17th day of December, 1917.

BERTHOLD NAGY.

Witnesses:
T. T. WENTWORTH,
BERTHA MUELLER.